Dec. 22, 1964  R. F. SCHMIDT ETAL  3,162,828
CROSS-LINEAR POLARIZATION SYSTEM
Filed March 2, 1961  2 Sheets-Sheet 1

INVENTORS.
RAYMOND F. SCHMIDT.
LEONARD A. BRUENEMAN.
BY Alden D. Redfield
Irwin P. Garfinkle
ATTORNEYS.

INVENTORS.
RAYMOND F. SCHMIDT.
LEONARD A. BRUENEMAN.
BY
ATTORNEYS.

United States Patent Office 3,162,828
Patented Dec. 22, 1964

3,162,828
CROSS-LINEAR POLARIZATION SYSTEM
Raymond F. Schmidt, Buffalo, N.Y., and Leonard A. Brueneman, St. Bernard, Ohio, assignors to Avco Corporation, Cincinnati, Ohio, a corporation of Delaware
Filed Mar. 2, 1961, Ser. No. 92,952
2 Claims. (Cl. 333—6)

This invention relates to a linear-polarization system and, more particularly, to radar apparatus for propagating electromagnetic waves of one polarization and for receiving and separating waves of both the transmitted polarization and the cross-polarized component.

It has been found that in many types of radar equipment the use of linear-polarized electromagnetic waves has resulted in many advantages, foremost of which are anti-jamming operation and rain discrimination. It is known that when a plane-polarized wave is transmitted through rain, the reflections from the raindrops are essentially unaffected and will be reflected in the same polarization as transmitted, while cross-linear components of the polarized wave are reflected by targets such as aircraft or ships. By means of this invention the direct and cross-linear components of the reflected waves are automatically separated into direct and cross channels, respectively, the direct-linear component being used for maximum range in good weather and the cross-linear component being used for rain discrimination. If the system is truly orthogonal and if the rain return is not depolarized, no rain return is received in the cross-linear channel, and complete rain clutter rejection results. It has been found that the transmission of vertically polarized waves produces the best results for rain discrimination, particularly at low elevation.

The advantage of the use of this invention as a countermeasure against jamming by noise or chaff is also significant. Chaff discrimination using cross-linear polarization techniques is based on the principles that (1) the target return in the cross-polarization channel is less than that in the direct polarization channel and (2) the depolarization ratio for chaff is greater than that for the target. Thus, the reflected cross-polarized components containing the chaff and target signals may be subtracted from the reflected direct polarized components. The chaff return having approximately equal amplitude in the direct and cross channels is thereby appreciably reduced, but the subtraction does not result in appreciable reduction of the target signal. With noise jamming the polarization most likely to be used is elliptical with erratic rotation of the major axis of the ellipse. Actual practice indicates that the subtraction of the video signals appearing in the direct and cross channels will substantially reduce noise jamming interference. Similar results are expected against noise jamming with linear polarization.

It will be recognized that the apparatus of this invention may be used to transmit vertically or horizontally polarized waves and is adaptable to other polarizations.

It is an object of this invention to produce a lightweight, high power, broadband, cross-linear polarization system capable of transmitting waves of one polarization and receiving and automatically separating the signal into the one polarization and the cross-polarized component.

Another object of this invention is to provide a dual mode transducer for transmitting a wave of one polarization and receiving and separating the direct and cross components, the transducer being simple and compact, having no moving parts, and requiring no tuning or adjustment.

Another object of this invention is to provide reliable means for discrimination between man-made targets and echo returns produced by natural and simulated natural forms usually recognized as undesirable interference.

Still another object of this invention is the simplification of the antenna feed device of a radar antenna, particularly with respect to its weight, size, and complexity.

A still further object of this invention is the provision of a cross-linear polarization system capable of isolation between orthogonally polarized signals of 35 db or more.

For a more detailed explanation and understanding of this invention, reference should now be made to the following specification and to the accompanying drawings, in which.

Figure 1:
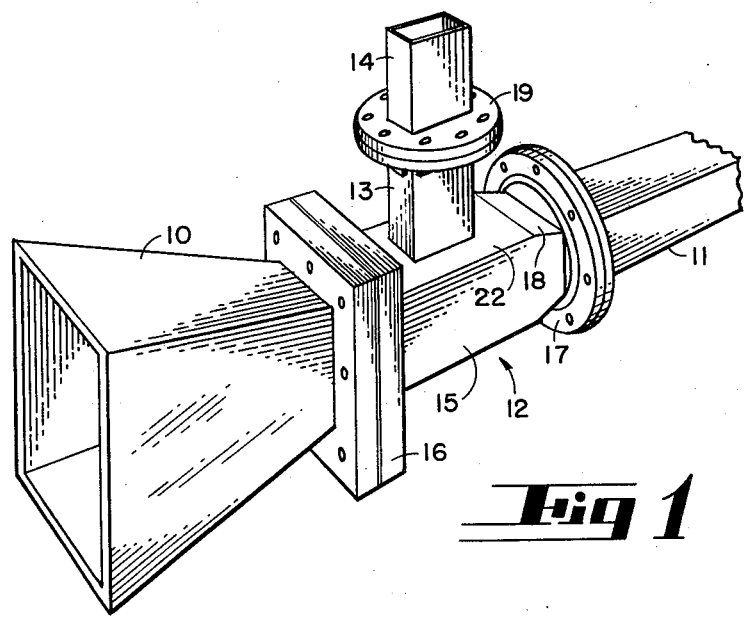
FIG. 1 is a perspective view of an antenna system incorporating this invention.
Figure 2:
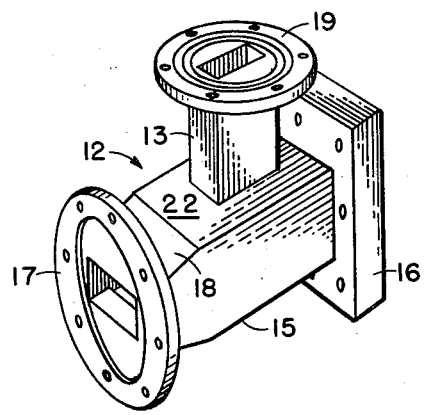
FIG. 2 is a perspective view of the dual mode transducer incorporated in this invention.

The antenna system illustrated in FIG. 1 comprises a flared horn antenna 10 for directionally radiating electromagnetic energy into space. The antenna 10 is supplied with vertically polarized energy from a standard rectangular waveguide 11 through a dual mode transducer generally indicated at 12. Depending on the nature of the intercepted target or targets, reflected energy received at the antenna 10 contains both the direct (the vertical) and the cross-polarized components (the horizontal) of the transmitted electromagnetic energy. The transducer 12 is such that the direct-polarized components are passed through to the standard waveguide 11, the cross-polarized components being rejected at this point; and the cross-polarized components are passed through standard waveguides 13 and 14, the direct-polarized components being rejected at this point.

The transducer 12 comprises a length of waveguide 15 mechanically coupled to the horn antenna 10 by means of conventional choke-type coupling flanges 16 and to the waveguide 11 by means of conventional choke-type coupling flanges 17 through an impedance-matching waveguide transformer section 18. Similarly the waveguide 14 is coupled to the waveguide 13 by conventional choke coupling flanges 19. The waveguide 15 is made essentially square in cross section, since it must be capable of accepting electromagnetic energy of both the direct-polarized and the cross-polarized components.

The impedance-matching section 18 of the dual mode transducer is provided with apertures having cross-sectional dimensions required to mate the square waveguide 15 with the waveguide 11. The horizontal dimension of the waveguide 11 is equal to the horizontal dimension of the waveguide 15, but the vertical dimension is reduced to about one-half that of the vertical dimension. It will be seen that this dimensional relationship between the square waveguide 15 and the standard rectangular waveguide 11 is such that the electrical field of the vertically polarized vector of the transmitted and received waves will be permitted to pass from one waveguide to the other in both directions, while the electric field of the received horizontally polarized components will be rejected at the junction of the waveguides.

For the purpose of providing a path for the cross-polarized components (the horizontal components) of the received energy from the waveguide 15 to the waveguide 13, the waveguide 13 is coupled to the waveguide 15 at a rectangular aperture 20 in the waveguide wall 22. The dimensions of the aperture 20 correspond to the dimensions of the waveguide 13 and are such that the major dimension is parallel to the direction of propagation. This dimensional relationship will permit the passage through the aperture 20 of the electric field of received horizontally polarized components, but will reject the electric field of both the received and transmitted vertically polarized components.

The dual mode transducer 12 is provided with several cooperating devices for producing essentially one hundred percent rejection of the horizontally polarized components at the waveguide 11, and essentially one hundred percent rejection of the vertically polarized components at the waveguide 13. These devices include the impedance-matching transformer section 18, a septum 24, and an impedance-matching transformer 26.

As previously noted, the impedance-matching transformer section 18 is provided with a fixed horizontal dimension; however, the vertical dimension is reduced by means of a plurality of steps 28 to the vertical dimension of the waveguide 11. This arrangement of steps has the effect of permitting a broad band of frequencies to pass, while maintaining a minimum VSWR. Because of the dimensional relationships—i.e., the stepped reduction in cross section of the vertical dimension—a broad band of vertically polarized received and transmitted signals are permitted to pass in either direction from the square waveguide 15 to the rectangular waveguide 11, while rejecting substantially all of the horizontal components.

The septum 24 is made of a conductive material and is horizontally positioned somewhat aft of the aperture 20 (from the horn antenna 10) across the entire width of the waveguide 15 at the middle of the vertical walls. In effect, the waveguide 15 is converted into two waveguides by the septum 24, each guide having a cross section approximately that of waveguide 11. Therefore, septum 24 is transparent to the vertically polarized components—that is to say, the vertically polarized components are unaffected by septum 24. Septum 24 is positioned slightly aft of the aperture (from the antenna), and in conjunction with the impedance-matching transformer 26, it provides an impedance match between the square waveguide 15 and the rectangular waveguide 13 for the horizontally polarized components. Whereas the septum 24 is transparent to vertically polarized components, the same structure presents a high impedance to the passage of horizontal components and hence essentially all horizontal components are rejected at the septum 24. However, since a proper match is provided by the transformer 26, essentially all the horizontal components are permitted to pass into the guide 13. The sloped portion 28 of the transformer 26 is provided for matching over the band of frequencies while the ridge portion 30 provides matching for a narrower bandwidth.

For the purpose of reducing the effect of the aperture 20 on the vertically polarized components, a grille 32 is inserted therein.

Figure 9:
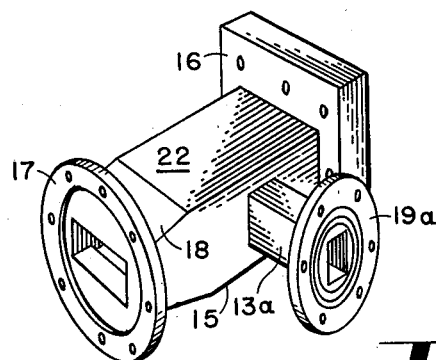
FIG. 9 is a perspective view of a modified form of the transducer of this invention.
Figure 3:
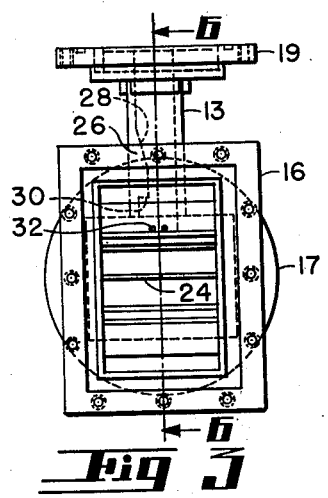
FIGS. 3–8 are views showing the detailed construction of the dual mode transducer illustrated in FIGS. 1 and 2.
Figure 4:
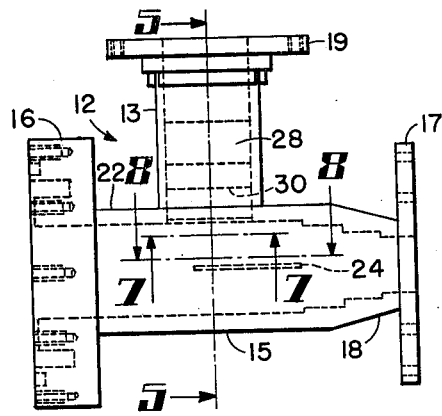
Figure 5:
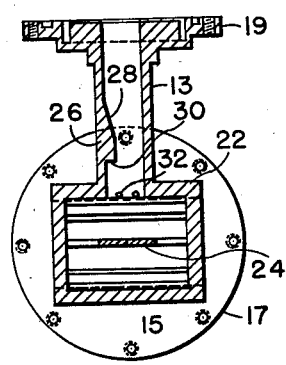
Figure 6:
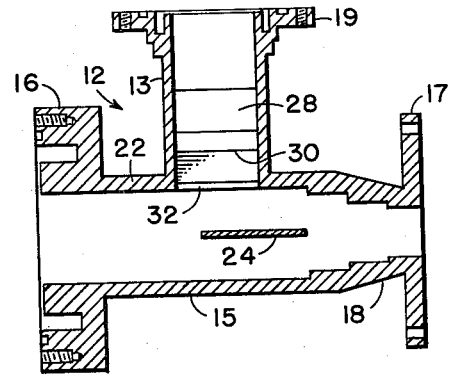
Figure 7:
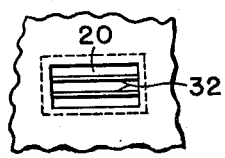
Figure 8:
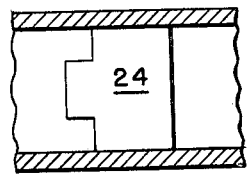

The embodiment of this invention illustrated in FIG. 9 is essentially identical with that of FIGS. 1-8, with the exception that the standard waveguide 13a is positioned in a vertical wall, rather than in the upper wall, and hence is oriented at 90° from the position of the waveguide 13. The remaining interior structure remains unchanged.

It is clear that many variations in specific structure will be feasible. For example, the waveguide 15 need not be perfectly square, and the embodiments described were not square as reduced to practice. It is only necessary that the dimensional relationships are such the waveguide 15 be capable of carrying both the horizontal and vertical components of the received wave. Also, for certain applications the impedance-matching devices, such as the transformers 18 and 26 and the septum 24, may take equivalent forms.

Also, it may be desirable to transmit circular or elliptically polarized waves and to separate the received wave into any two orthogonal, linear-polarized components. This may require incorporation of external phase shifters, duplexers, or other apparatus. By using power splitters, both circular or elliptical and linear polarizations could be received simultaneously. However, it may be that in many of these cases the device will not be as broadband as when linear polarizations are transmitted. It is intended, therefore, that this invention be limited only by the appended claims as interpreted in the light of the prior art.

We claim:
1. An orthogonal mode transducer comprising an essentially square waveguide capable of supporting first and second modes of energy wherein the electric fields thereof are orthogonally disposed with respect to each other;
   a first rectangular waveguide disposed in substantial axial alignment with said essentially square waveguide; a second rectangular waveguide coupled to said essentially square waveguide substantially normally to the axis thereof by means of a rectangular aperture opening into said essentially square waveguide, said aperture having the longest dimension thereof parallel to the axis of said essentially square waveguide whereby only energy in the first of said modes will be coupled into said second rectangular waveguide, the broad walls and the narrow walls of said second rectangular waveguide being disposed substantially normal to the broad walls and the narrow walls of said first rectangular waveguide, respectively;
   a transition section disposed between said first rectangular waveguide and said essentially square waveguide for coupling said essentially square waveguide to said first rectangular waveguide, said transition section including successively stepped portions effective to vary one of the transverse dimensions of said section between those of said essentially square waveguide and of said first rectangular waveguide whereby energy in the second of said modes will be coupled between said essentially square waveguide and said first rectangular waveguide; and
   a septum disposed in said essentially square waveguide aft of said second waveguide and entirely within the undiminished cross section of said essentially square waveguide adjacent said transition section to prevent energy in said first mode from entering said first waveguide.
2. The invention as defined in claim 1, and an impedance matching means in said second waveguide adjacent said rectangular aperture.

References Cited by the Examiner

UNITED STATES PATENTS

| | | | |
|---|---|---|---|
| 2,885,677 | 5/59 | Zaleski | 333—24.3 |
| 2,897,457 | 7/59 | Marié | 333—9 |
| 2,975,380 | 3/61 | Scharfman | 333—21 |
| 3,004,228 | 10/61 | Fogel | 333—21 |

FOREIGN PATENTS 140,425   3/51   Australia.

HERMAN KARL SAALBACH, *Primary Examiner.*
CHESTER L. JUSTUS, *Examiner.*